(12) United States Patent
Ahn et al.

(10) Patent No.: US 12,531,973 B2
(45) Date of Patent: Jan. 20, 2026

(54) METHOD AND APPARATUS FOR VIDEO CODING USING MATRIX BASED CROSS-COMPONENT PREDICTION

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 167 days.

(21) Appl. No.: 18/241,640

(22) Filed: Sep. 1, 2023

(65) Prior Publication Data

US 2023/0421752 A1    Dec. 28, 2023

Related U.S. Application Data

(63) Continuation of application No. PCT/KR2022/003214, filed on Mar. 7, 2022.

(30) Foreign Application Priority Data

Mar. 8, 2021  (KR) .................. 10-2021-0030284
Mar. 7, 2022  (KR) .................. 10-2022-0028498

(51) Int. Cl.
*H04N 19/00*  (2014.01)
*H04N 19/105*  (2014.01)
(Continued)

(52) U.S. Cl.
CPC ......... *H04N 19/105* (2014.11); *H04N 19/176* (2014.11); *H04N 19/182* (2014.11);
(Continued)

(58) Field of Classification Search
None
See application file for complete search history.

(56) References Cited

U.S. PATENT DOCUMENTS 11,012,699 B2   5/2021  Choi et al.
11,082,709 B2   8/2021  Yang et al.
(Continued)

FOREIGN PATENT DOCUMENTS

KR   20200019201 A   2/2020
KR   20200074218 A   6/2020
KR   20210018137 A   2/2021

OTHER PUBLICATIONS

Blanch, Marc Gorriz et al., Chroma Intra Prediction With Attention-Based CNN Architectures, 2020 IEEE International Conference on Image Processing (ICIP), Jun. 27, 2020, 5 pp, doi: 10.1109/ICIP40778.2020.9191050.
(Continued)

*Primary Examiner* — Zhihan Zhou
(74) *Attorney, Agent, or Firm* — Lempia Summerfield Katz LLC

(57) ABSTRACT

A method and an apparatus for video coding using a matrix-based cross-component prediction are disclosed. The video coding method and apparatus predict a chroma component of a current block, by using a deep learning-based matrix operation, from a chroma component spatially adjacent to a chroma block of the current block and from a luma component spatially adjacent to a luma block corresponding to the chroma block.

15 Claims, 17 Drawing Sheets

(51) Int. Cl.
*H04N 19/176* (2014.01)
*H04N 19/182* (2014.01)
*H04N 19/186* (2014.01)
*H04N 19/82* (2014.01)
*H04N 19/88* (2014.01)

(52) U.S. Cl.
CPC ........... *H04N 19/186* (2014.11); *H04N 19/82* (2014.11); *H04N 19/88* (2014.11)

(56) References Cited

U.S. PATENT DOCUMENTS

| | | |
|---|---|---|
| 11,412,236 B2 | 8/2022 | Choi et al. |
| 11,706,426 B2 | 7/2023 | Choi et al. |
| 2020/0154118 A1* | 5/2020 | Yang ................... H04N 19/176 |
| 2020/0280717 A1 | 9/2020 | Li et al. |
| 2020/0296391 A1 | 9/2020 | Choi et al. |
| 2021/0176480 A1 | 6/2021 | Choi et al. |
| 2021/0297682 A1 | 9/2021 | Yang et al. |
| 2022/0248036 A1 | 8/2022 | Choi et al. |
| 2022/0272355 A1* | 8/2022 | Singh ................... H04N 19/186 |
| 2023/0262251 A1* | 8/2023 | Ma ........................ H04N 19/50 375/240.12 |

OTHER PUBLICATIONS

International Search Report and Written Opinion cited in corresponding international app No. PCT/KR2022/003214; Jul. 5, 2022; 9 pp.

* cited by examiner

METHOD AND APPARATUS FOR VIDEO CODING USING MATRIX BASED CROSS-COMPONENT PREDICTION

CROSS-REFERENCE TO RELATED APPLICATIONS

This application is a Continuation of International Application No. PCT/KR2022/003214 filed on Mar. 7, 2022, which claims priority to Korean Patent Application No. 10-2021-0030284 filed on Mar. 8, 2021, and Korean Patent Application No. 10-2022-0028498 filed on Mar. 7, 2022, the entire disclosures of which are incorporated herein by reference.

TECHNICAL FIELD

The present disclosure relates to a video coding method and an apparatus using a matrix-based cross-component prediction.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Recently, deep learning-based image processing techniques have been applied to existing encoding elemental technologies. Coding efficiency can be improved by applying deep learning-based image processing techniques to existing encoding techniques, in particular, compression techniques such as inter prediction, intra prediction, in-loop filter, transform, etc. Representative application examples include inter prediction based on virtual reference frames generated by deep learning models and include in-loop filter based on denoising models. Therefore, deep learning-based image processing technology needs to be employed further to improve the coding efficiency in image encoding/decoding.

SUMMARY

The present disclosure in some embodiments seeks to provide a video coding method and an apparatus for predicting a chroma component of a current block using a luma component. The video coding method and apparatus predict the chroma component of the current block, by using a deep learning-based matrix operation, from a chroma component spatially adjacent to a chroma block of the current block and from a luma component spatially adjacent to a luma block corresponding to the chroma block.

At least one aspect of the present disclosure provides a method performed by a computing device for predicting a chroma component of a current block using a luma component. The method comprises obtaining reference pixels that include chroma reference pixels spatially adjacent to a chroma block of the current block and include luma reference pixels adjacent to a luma block corresponding to the chroma block. The method also comprises generating an input block formed as a one-dimensional (1D) vector or a two-dimensional (2D) vector by rearranging the reference pixels. The method also comprises generating a chroma prediction block of the current block by inputting the input block into an estimating model that is a deep learning-based model.

Another aspect of the present disclosure provides a cross-component prediction device for predicting a chroma component of a current block by using a luma component. The device comprises an input unit configured to obtain reference pixels that include chroma reference pixels spatially adjacent to a chroma block of the current block and include luma reference pixels adjacent to a luma block corresponding to the chroma block. The device also comprises a preprocessor configured to generate an input block formed as a one-dimensional (1D) vector or a two-dimensional (2D) vector by rearranging the reference pixels. The device also comprises an estimator comprising an estimating model that is a deep learning-based model and configured to generate a chroma prediction block of the current block by inputting the input block into the estimating model.

Yet another aspect of the present disclosure provides a method performed by a computing device for predicting a chroma component of a current block using a luma component. The method comprises obtaining reference pixels and reconstructed pixels. The reference pixels include chroma reference pixels spatially adjacent to a chroma block of the current block and include luma reference pixels adjacent to a luma block corresponding to the chroma block. The reconstructed pixels represent reconstructed pixels of the luma block. The method also comprises generating an input block formed as a one-dimensional (1D) vector or a two-dimensional (2D) vector by rearranging the reference pixels and the reconstructed pixels. The method also comprises generate a chroma prediction block of the current block by inputting the input block into an estimating model that is a deep learning-based model.

As described above, the present disclosure provides a video coding method and an apparatus for predicting a chroma component of a current block, by using a deep learning-based matrix operation, from a chroma component spatially adjacent to a chroma block of the current block and from a luma component spatially adjacent to a luma block corresponding to the chroma block, to improve the coding efficiency of the chroma component of the current block.

DETAILED DESCRIPTION

Figure 1:
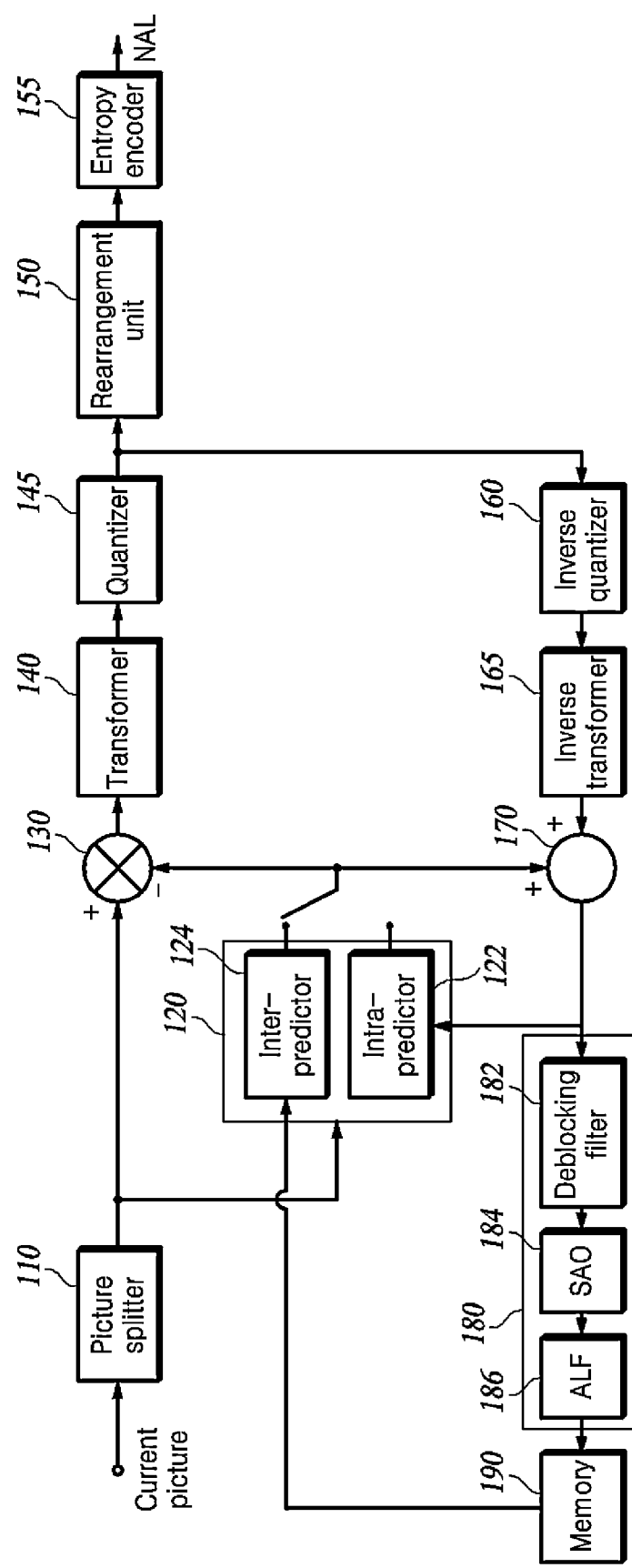
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
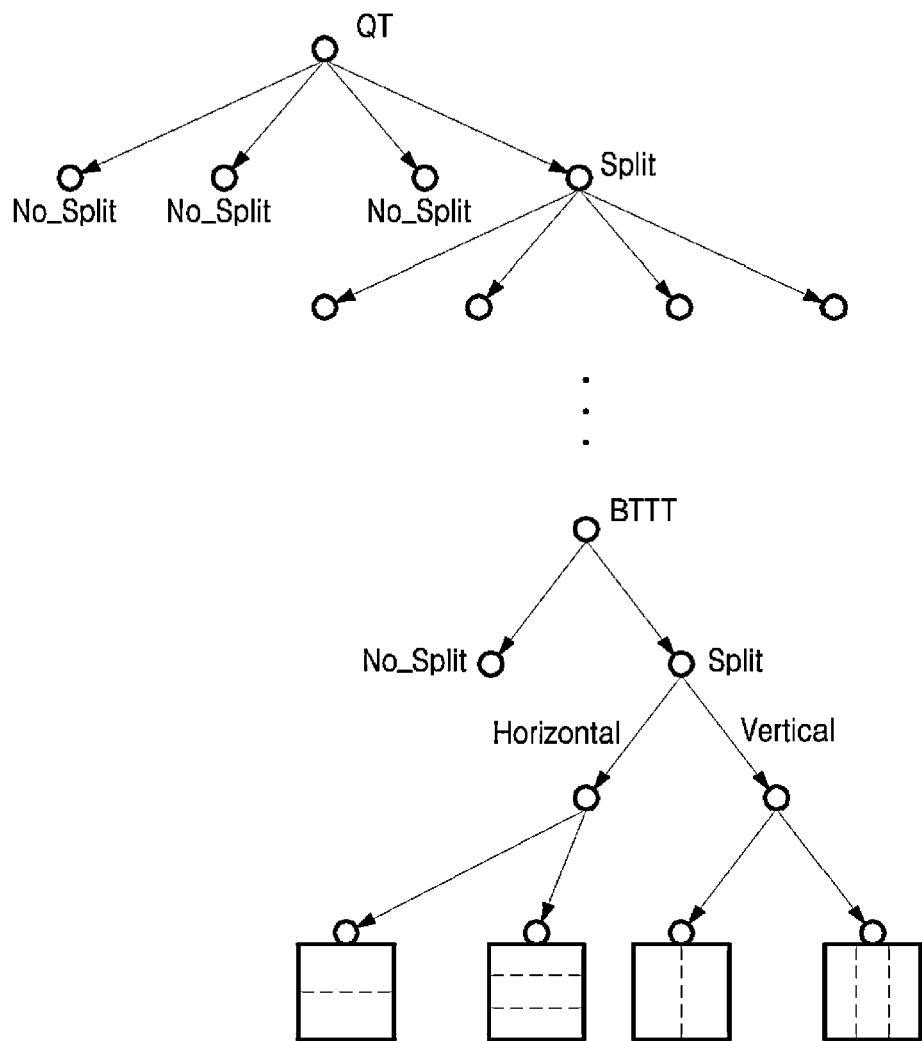
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
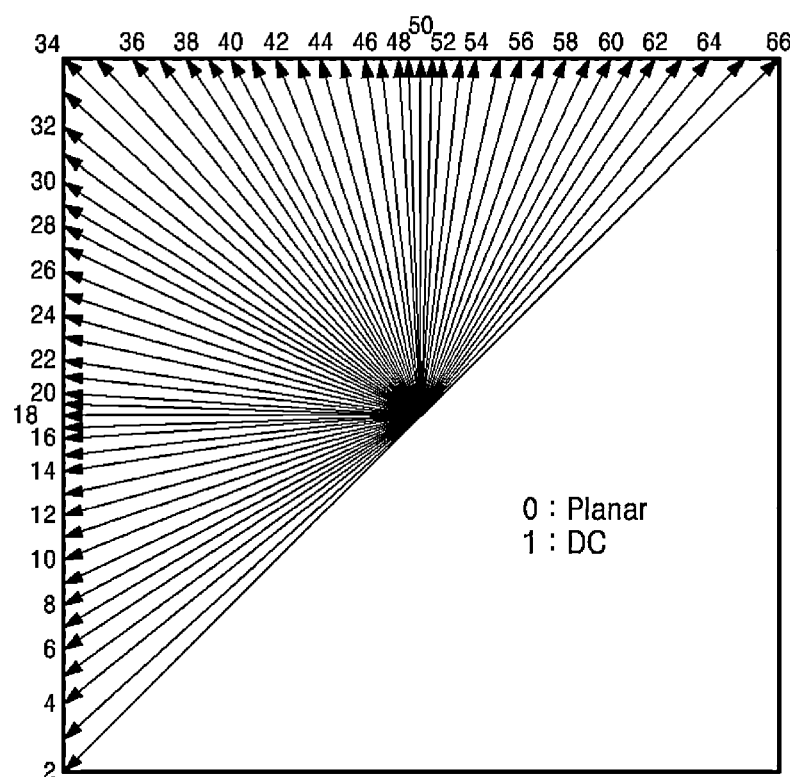
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
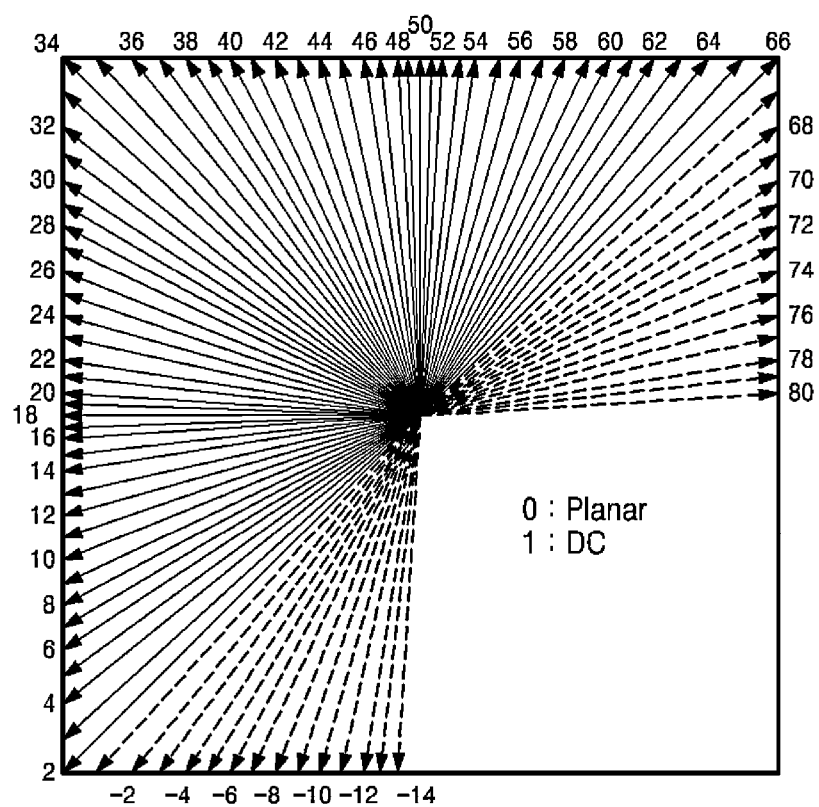

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
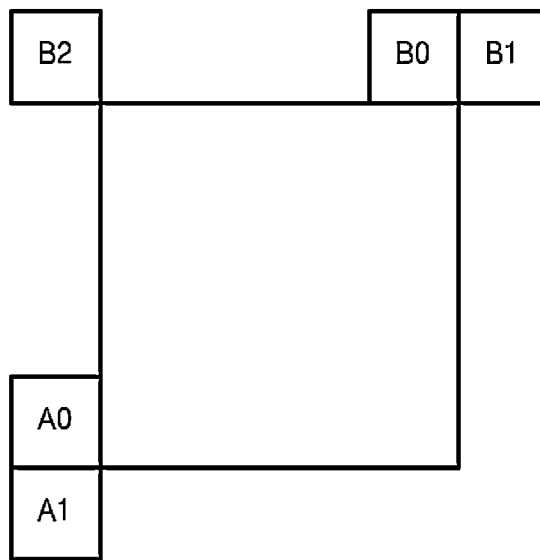
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_jdx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
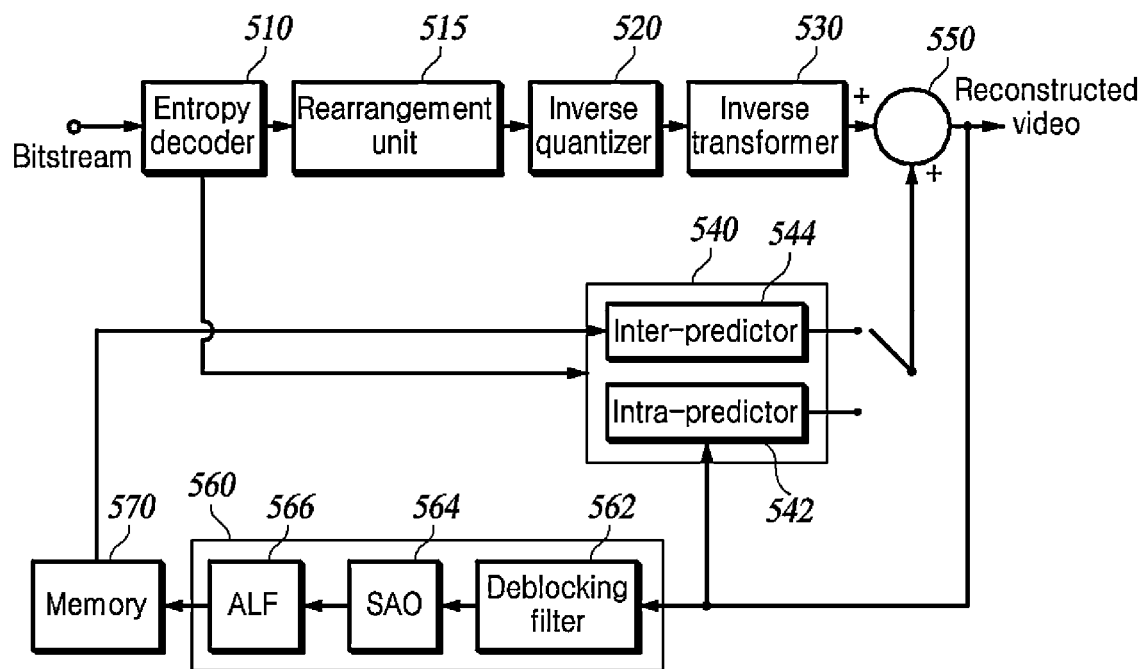
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for predicting a chroma component of a current block, by using a deep learning-based matrix operation, from a chroma component spatially adjacent to a chroma block of the current block and from a luma component spatially adjacent to a luma block corresponding to the chroma block.

The following embodiments may be commonly applied to the intra predictor 122 in the video encoding apparatus and the intra predictor 542 in the video decoding apparatus.

In the following description, the term 'target block' to be encoded/decoded may be used interchangeably with the current block or coding unit (CU) as described above, or the term 'target block' may refer to some area of the coding unit.

Hereinafter, a target block includes a luma block including a luma component and a chroma block including a chroma component. The chroma block of the target block is represented by the target chroma block or the current chroma block. The luma block of the target block is represented by the target luma block or the current luma block.

I. Cross-Component Prediction

In performing prediction in a video encoding/decoding method and an apparatus, a method of generating a prediction block of a current block from a color component that is different from a color component of the target block to be encoded and decoded is defined as a cross-component prediction. In the Versatile Video Coding (VVC) technique, cross-component prediction is used to intra-predict the current chroma block, which is called cross-component linear model (CCLM) prediction. The following describes CCLM prediction, i.e., cross-component prediction using a linear model.

Figure 6:
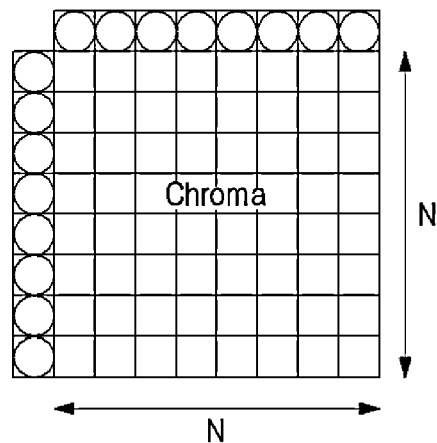
FIG. 6 is a diagram illustrative of neighboring pixels referenced for cross-component prediction.
Figure 6:
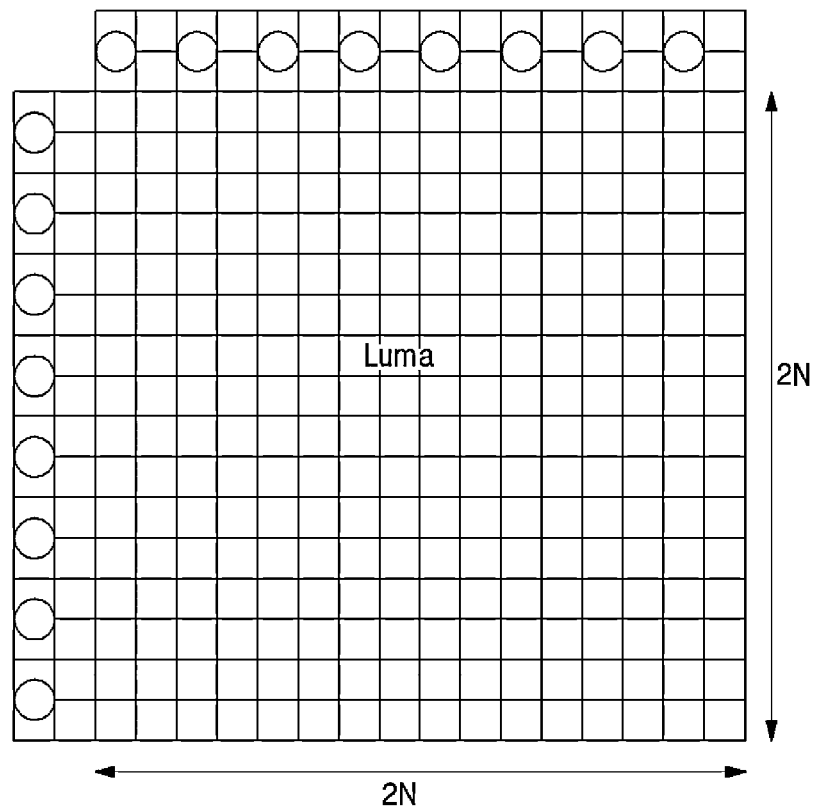

FIG. 6 is an example diagram illustrating the neighboring pixels referenced for cross-component prediction.

To perform cross-component prediction of a target chroma block, left reference pixels and top reference pixels of a luma block corresponding to the target chroma block may be utilized, and left reference pixels and top reference pixels of the target chroma block may be utilized, as illustrated in FIG. 6. Hereinafter, the left reference pixels and the top reference pixels are collectively referred to as reference pixels, neighboring pixels, or adjacent pixels. Furthermore, the reference pixels of the chroma component are represented by chroma reference pixels, and the reference pixels of the luma component are represented by luma reference pixels. In the example of FIG. 6, the size of the chroma block, i.e., the number of pixels, is represented by N×N (where N is a natural number).

In CCLM prediction, a prediction block that is a predictor of the target chroma block is generated by deriving a linear model between the reference pixels of a luma block and the reference pixels of a chroma block and then applying that linear model to the reconstructed pixels of the corresponding luma block.

Figure 7:
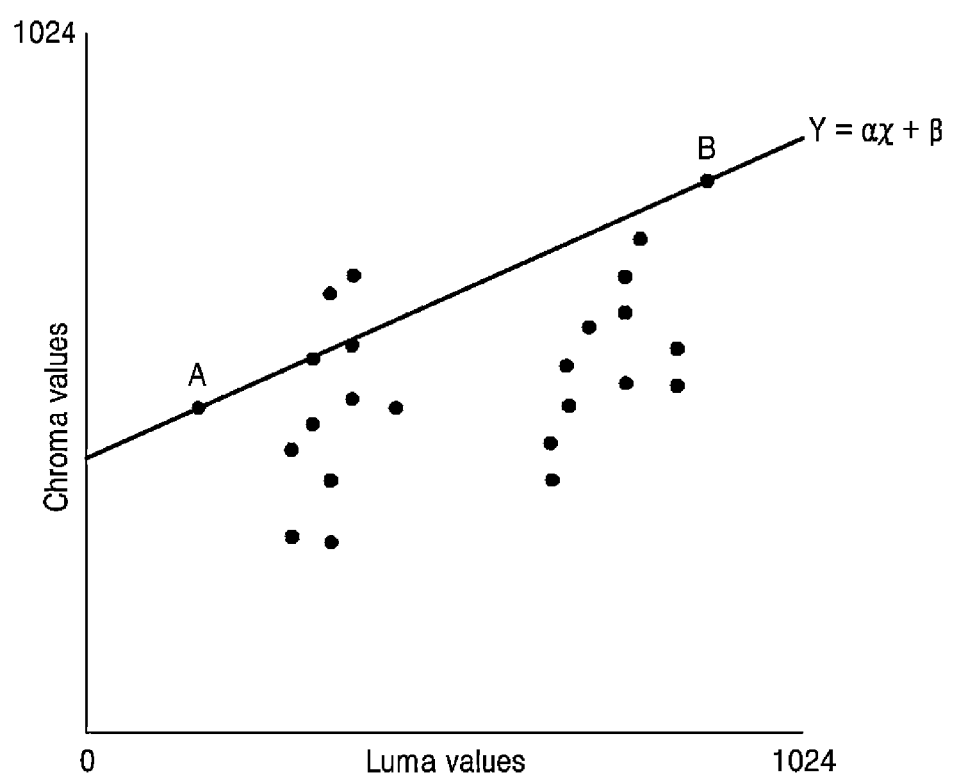
FIG. 7 is an example diagram conceptually illustrating the derivation of a linear model for cross-component prediction.

FIG. 7 is an example diagram conceptually illustrating the derivation of a linear model for cross-component prediction.

In one example, a linear function may be derived based on a minimum value of a neighboring luma pixel, a chroma value co-located with the neighboring luma pixel, a maximum value of a neighboring luma pixel, and a chroma value co-located with the neighboring luma pixel. In the example of FIG. 7, point A is an ordered pair of (minimum value of a neighboring luma pixel, and chroma value co-located with a neighboring luma pixel) and point B is an ordered pair of (maximum value of a neighboring luma pixel, and chroma value co-located with a neighboring luma pixel).

In another embodiment, instead of deriving a linear model using only one minimum and one maximum value each, a linear model may be derived using an average of a plurality of minimum values and using an average of a plurality of maximum values. In this case, two or more pixel values may be used as the plurality of minimum and maximum values.

In another embodiment, after deriving one or more linear models, the one or more linear models may be used to perform cross-component estimation of the target chroma block.

For example, when using two linear models, a point C is set that is the (median of the neighboring luma pixels, and chroma value co-located with the surrounding luma pixels). The linear model between point A and point C is defined as the first linear model, and the linear model between point C and point B is defined as the second linear model, allowing different linear models to be applied to the cross-component prediction depending on the range of luma pixel values covered. Thus, depending on the number of medians, cross-component prediction using one or more linear models may use two linear models, three linear models, or more linear models.

Meanwhile, for cross-component prediction using one or more linear models, the video encoding apparatus may signal the number of linear models directly to the video decoding apparatus to indicate how many linear models to be used for the target block.

Alternatively, the number of linear models to be applied to the current block may be derived based on the size of the current block. For example, for a current block having a size of 32×32 or larger, the video encoding/decoding apparatus may use two linear models to perform cross-component prediction. In this case, the size of 32×32 is an example and is not necessarily limited thereto. Namely, the video encoding/decoding apparatus according to the present embodiment may use a preset size of the current block, such as 32×16, 16×16, or the like, as a basis for determining the number of linear models.

II. Matrix-Based Intra-Cross-Component Prediction

Figure 8:
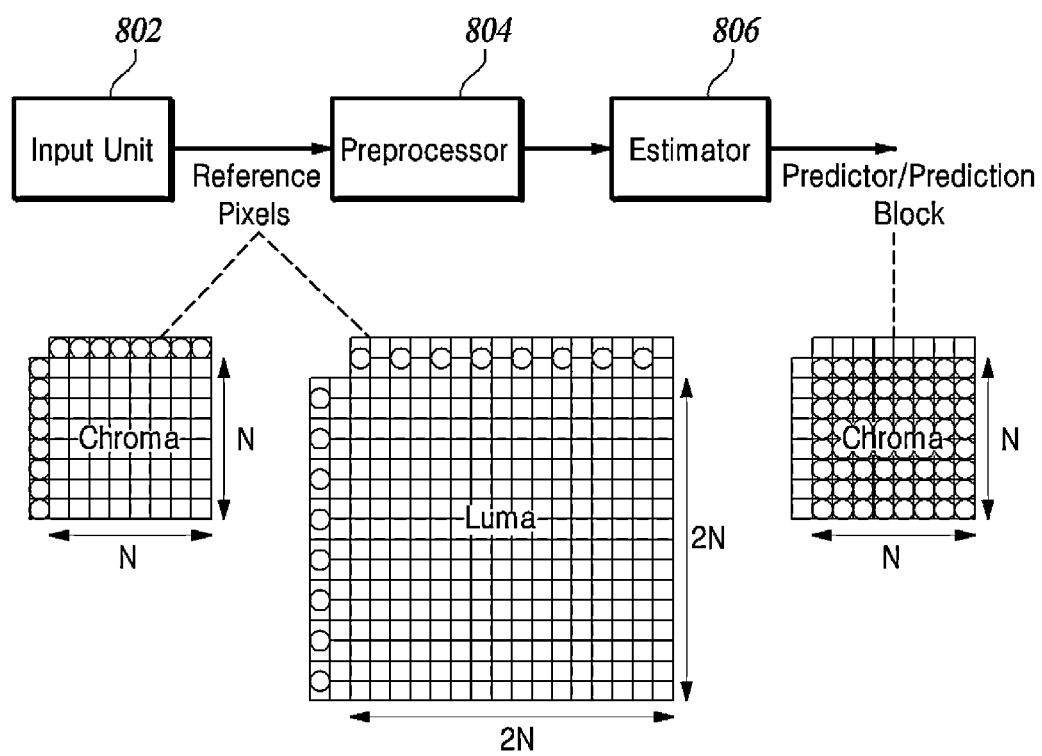
FIG. 8 is an example diagram conceptually illustrating a matrix-based cross-component prediction device, according to at least one embodiment of the present disclosure.

FIG. 8 is an example diagram conceptually illustrating a matrix-based intra-cross-component prediction device, according to at least one embodiment of the present disclosure.

A matrix-based cross-component prediction device (hereinafter, "prediction device") according to this embodiment utilizes a deep learning-based estimating model that performs matrix operations for generating a chroma prediction block, which is a predictor, from neighboring pixels spatially adjacent to a target chroma block and from neighboring pixels adjacent to a luma block corresponding to the target chroma block. The prediction device includes all or some of an input unit 802, a preprocessor 804, and an estimator 806. Such a prediction device may be common to the intra predictor 122 in the video encoding apparatus and the intra predictor 542 in the video decoding apparatus, as described above. When included in the intra predictor 122 in the video encoding apparatus, the prediction device components included in the video encoding apparatus according to the present embodiment are not necessarily limited to those illustrated. For example, the video encoding apparatus may further include a training unit (not shown) for training the deep learning model included in the prediction device, or the video encoding apparatus may be implemented in conjunction with an external training unit.

The input unit 802 obtains reference pixels. The reference pixels here include, for a target chroma block, chroma reference pixels spatially adjacent to the target chroma block and include luma reference pixels adjacent to a luma block corresponding to the target chroma block. The reference pixels illustrated in FIG. 8 are the same as the reference pixels illustrated in FIG. 6. Thus, the reference pixels may include left neighboring pixels and top neighboring pixels of the chroma block or luma block, as described above. The reference pixels are transferred to the preprocessor 804.

When the input unit 802 obtains the chroma reference pixels of the target chroma block, the input unit 802 may utilize all or some of the left neighboring pixels and the top neighboring pixels depending on the size of the current block. At this time, when utilizing some of the neighboring pixels, to select them, the input unit 802 may utilize a downsampling method, a method of selecting one pixel for every certain pixel distance, or the like.

When obtaining the luma reference pixels of the luma block, the input unit 802 may utilize all or some of the left neighboring pixels and the top neighboring pixels depending on the size of the current block. Further, the input unit 802 may determine the locations and values of the luma reference pixels of the luma block according to the color format of the current picture. For example, as illustrated in FIG. 8, the reference pixels are obtained in a YUV 4:2:0 format. As another example, for a YUV 4:2:2 or YUV 4:4:4 format, the input unit 802 may select the reference pixels at locations different from those illustrated in FIG. Band determine their values.

In obtaining the reference pixels, the input unit 802 is not limited to using pixels corresponding to one row or one column, as illustrated in FIG. 8. For example, the input unit 802 may use two, three, four, or more rows for the pixels on the top, and two, three, four, or more columns for the pixels on the left.

The preprocessor 804 preprocesses the reference pixels of the target chroma block and the reference pixels of the luma block to generate vectorized reference pixels. The preprocessor 804 may rearrange the reference pixels to generate an array of 2D vector, i.e., a matrix. At this time, the preprocessor 804 may separately rearrange the chroma components and luma components of the reference pixels based on the locations of the reference pixels to generate the 2D vector, as illustrated in FIG. 9.

Figure 9:
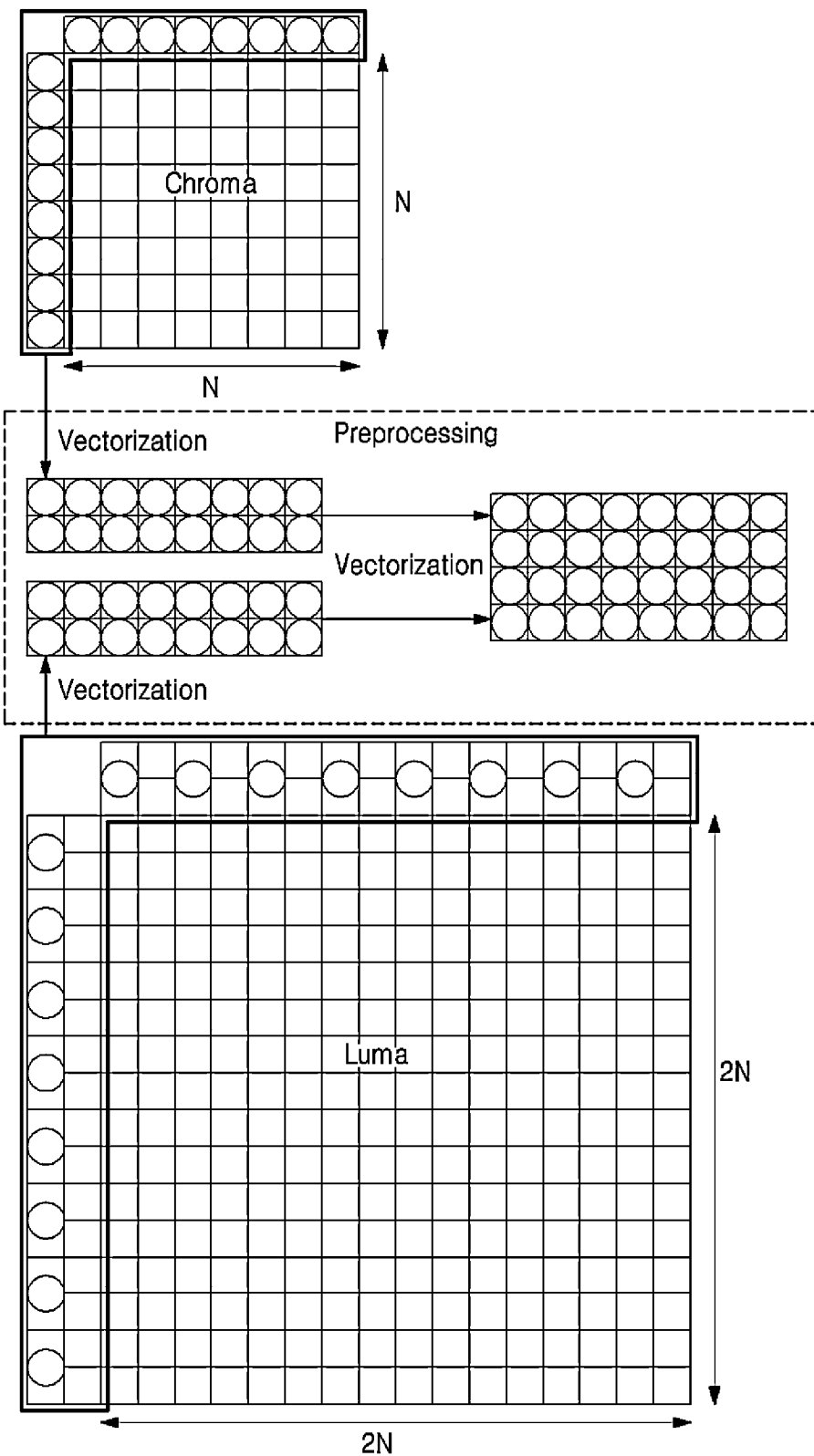
FIG. 9 is an example diagram illustrating preprocessing of reference pixels, according to at least one embodiment of the present disclosure.

Alternatively, and differently from the example in FIG. 9, the preprocessor 804 may alternately rearrange the chroma components and luma components of the reference pixels to generate a 2D vector. For example, the preprocessor 804 may alternately rearrange the reference pixels in the following order: the top chroma component, the top luma component, the left chroma component, and the left luma component.

In another embodiment, the preprocessor 804 may separately concatenate the chroma components and luma components of the reference pixels to generate a 1D vector. Alternatively, the preprocessor 804 may alternately concatenate the chroma components and luma components of the reference pixels to generate a 1D vector.

The rearranged reference pixels, either as a 2D vector or a 1D vector, are transferred to the estimator 806.

The estimator 806 performs cross-component prediction by using the deep learning-based estimating model to generate a chroma prediction block of the current block from the 2D vector or 1D vector of reference pixels. Here, the estimating model represents a deep neural network including one or more neural layers. The estimating model may include, as neural layers, all or some of convolutional layers, fully-connected layers, and pooling layers. The estimating model may be implemented in a form that includes only one type of neural layer, or the estimating model may further include a combination of different types of layers. For example, in one embodiment, the estimating model may be implemented with three convolutional layers, one fully connected layer, and one pooling layer.

The estimating model may take as input a 2D vector, i.e., a matrix, delivered by the preprocessor 804 and may generate a chroma prediction block in matrix form so that matrix-based operations are performed within the estimating model. Additionally, even when a 1D vector is inputted, matrix-based operations may be performed within the estimating model for the estimating model to generate a chroma prediction block in matrix form. In this case, the estimating model generates a chroma prediction block with the same size as the current chroma block.

In another embodiment, a plurality of matrix-formed kernels may be pre-trained to reduce the complexity of the estimation operation when performing deep learning-based cross-component prediction using an estimating model. Using one of the multiple kernels, the estimator 806 may compute a matrix multiplication between an array of inputted reference pixels and the trained kernel. In this case, an index may be utilized to indicate one of the plurality of kernels.

As described above, the estimator 806 may perform deep learning-based cross-component prediction to generate a chroma prediction block for the current block. The example in FIG. 8 illustrates the prediction device where the inputted current chroma block has a size of 8×8 and the outputted chroma prediction block has the same size of 8×8.

Meanwhile, the estimating model may be pre-trained by the training unit for allowing the estimating model learns to generate, from the inputted reference pixels, a chroma prediction block that is close to the original chroma block. In this case, one example of a loss function for training may be defined as an L2 metric between the chroma prediction block and the original chroma block. Alternatively, any metric that can represent the difference between the chroma prediction block and the original chroma block may be utilized as the loss function.

Meanwhile, the parameters of the trained estimating model may be shared between the video encoding apparatus and the video decoding apparatus.

In general, the size of the chroma prediction block as the output, i.e., the number of pixels, can directly affect the complexity and computation of the estimating model. Thus, in terms of reducing the computation of the estimating model, instead of generating a chroma prediction block with the same size as the current chroma block, the prediction device may generate a reduced chroma prediction block with a smaller size than the current chroma block. The prediction device may then post-process the reduced chroma prediction block to generate a chroma prediction block that is interpolated into the same size as the current chroma block.

Figure 10:
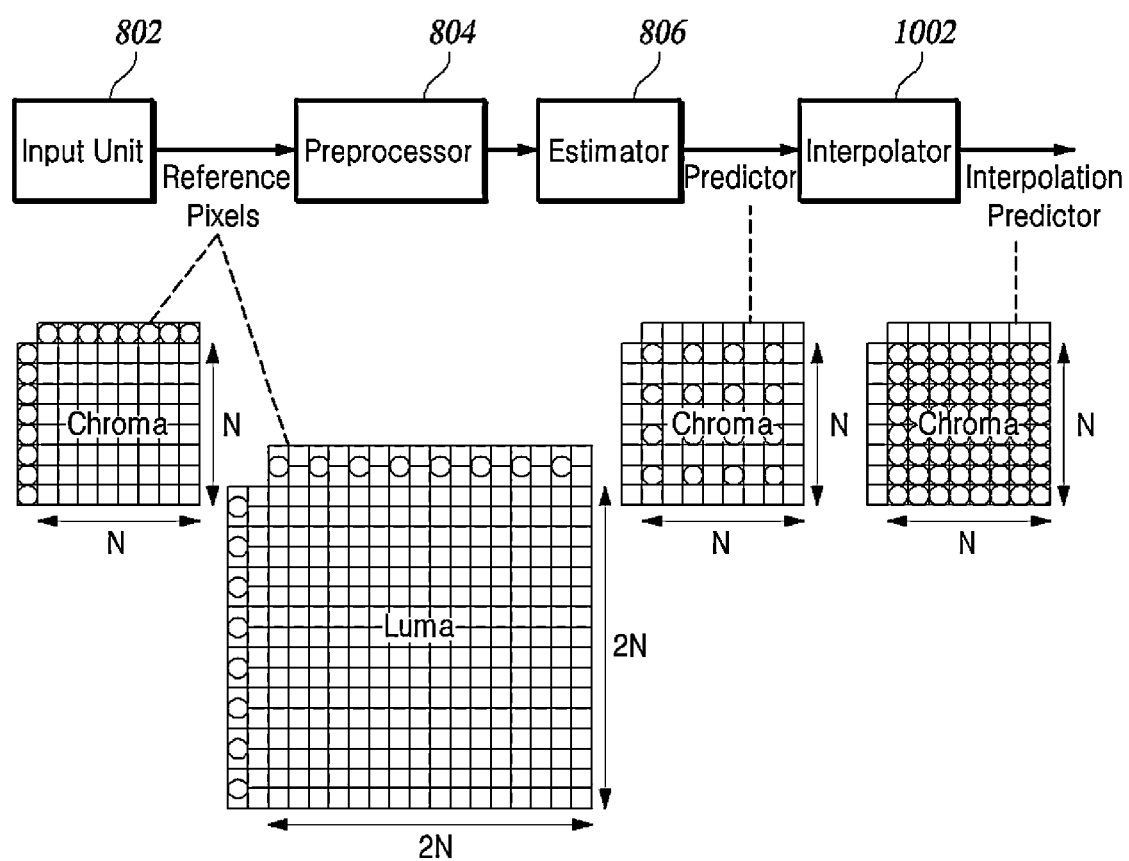
FIG. 10 is an example diagram conceptually illustrating a matrix-based cross-component prediction device, according to another embodiment of the present disclosure.

FIG. 10 is an example diagram conceptually illustrating a matrix-based cross-component prediction device, according to another embodiment of the present disclosure.

A prediction device according to this embodiment uses a deep learning-based estimating model that performs matrix operations to generate reduced chroma prediction blocks from reference pixels and then interpolates the reduced chroma prediction blocks to generate a final chroma prediction block. The prediction device may include an interpolator 1002 further to all or some of the input unit 802, preprocessor 804, or estimator 806. Such a prediction device may be common to the intra predictor 122 in the video encoding apparatus and the intra predictor 542 in the video decoding apparatus, as described above. When included in the intra predictor 122 in the video encoding apparatus, the prediction device components included in the video encoding apparatus according to the present embodiment are not necessarily limited to those illustrated. For example, the video encoding apparatus may further include a training unit (not shown) for training the deep learning model included in the prediction device, or the video encoding apparatus may be implemented in conjunction with an external training unit.

Hereinafter, the prediction device illustrated in FIG. 10 is described only for the differences from the example of FIG. 8. Thus, the operation of the input unit 802 and the preprocessor 804 remains the same, and a detailed description thereof is omitted.

The estimator 806 performs cross-component prediction by using a deep learning-based estimating model to generate a chroma prediction block of the current block from the reference pixels. The size of the generated chroma prediction block, i.e., the number of pixels, may be different from the number of pixels in the inputted target chroma block. For example, the number of pixels in the chroma prediction block may be smaller than the number of pixels in the target chroma block to reduce the computation of the estimating model. For example, as illustrated in FIG. 10, pixels in the chroma prediction block may be generated by the estimator 806 for their presence at locations where the pixels in the target chroma block are subsampled by half in the row/column direction, respectively.

The estimator 806 transfers the reduced chroma prediction block to the interpolator 1002.

Figure 11:
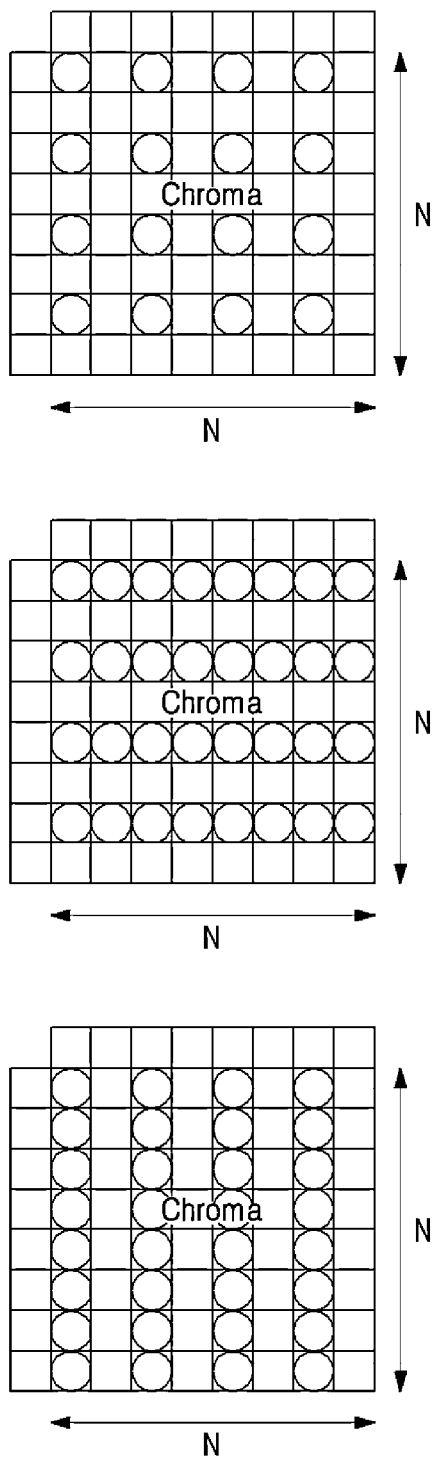
FIG. 11 is an example illustrating a reduced chroma prediction block, according to at least one embodiment of the present disclosure.

FIG. 11 is an example diagram illustrating a reduced chroma prediction block, according to at least one embodiment of the present disclosure.

The pixels in the reduced chroma prediction block may be pixels present at subsampled locations in the row or column direction in the target chroma block. As illustrated in FIG. 11, the pixels in the reduced chroma prediction block may be present at locations in the target chroma block that are subsampled in both the row and column directions, locations that are subsampled in the column direction only, and/or locations that are subsampled in the row direction only, etc. Depending on where the pixels of the reduced chroma prediction block are located, the interpolator 1002 may use different interpolation methods.

The interpolator 1002 generates pixel-to-pixel values according to a predefined operation so that the size (or number of pixels) of the interpolated chroma prediction block is equal to the size (or number of pixels) of the current chroma block. Thus, the interpolator 1002 generates the interpolated chroma prediction block. Here, the predefined operation refers to filtering the pixels of the reduced chroma prediction block by using an interpolation filter. As an interpolation filter, the interpolator 1002 may utilize a 6-tap interpolation filter, an 8-tap interpolation filter, a bi-linear interpolation filter, and the like.

In performing the above interpolation filter, the interpolator 1002 may utilize one predefined interpolation filter or may select one of the available interpolation filters by utilizing information of the block adjacent to the current block. In another embodiment, the video encoding apparatus may signal an index indicating the interpolation filter to the video decoding apparatus by each of certain encoding units.

The foregoing embodiments utilize, but are not necessarily limited to, as reference pixels, neighboring pixels spatially adjacent to the target chroma block and utilize neighboring pixels adjacent to the luma block corresponding to the target chroma block. For example, to improve the cross-component prediction performance of the target chroma block, the reconstructed pixels of the luma block corresponding to the target chroma block may additionally be utilized as reference pixels.

Figure 12:
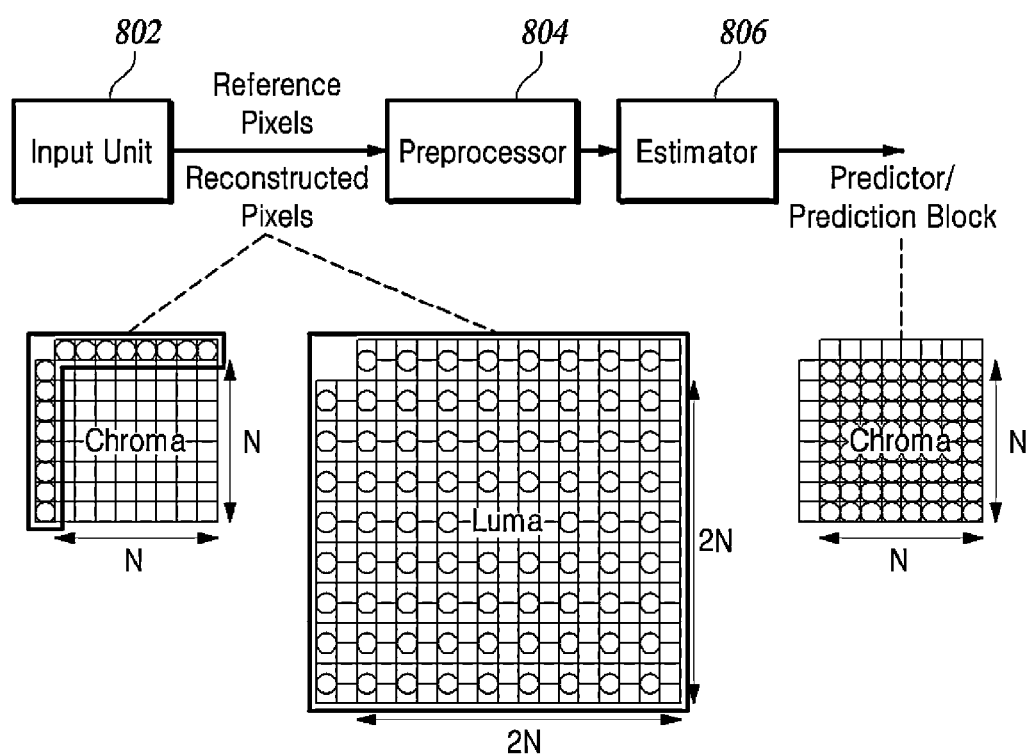
FIG. 12 is an example diagram conceptually illustrating a cross-component prediction device that further utilizes reconstructed luma pixels, according to another embodiment of the present disclosure.

FIG. 12 is an example diagram conceptually illustrating a cross-component prediction device that further utilizes reconstructed luma pixels, according to another embodiment of the present disclosure.

The prediction device according to this embodiment utilizes a deep learning-based estimating model that performs matrix operations to generate a chroma prediction block from reference pixels and reconstructed pixels in a luma block. The prediction device illustrated in FIG. 12 includes the same components as the example in FIG. 8.

However, further to the reference pixels, the input 802 may obtain the reconstructed pixels of the luma block corresponding to the target chroma block. The reference pixels here may include chroma reference pixels spatially adjacent to the target chroma block, and luma reference pixels adjacent to the luma block corresponding to the target chroma block. Further, the reconstructed pixels of the luma block represent reconstructed pixels before being transferred to the loop filter units 180, 560. The reconstructed pixels may be subsampled as illustrated in FIG. 12. The input unit 802 transfers the obtained reference pixels and the reconstructed pixels to the preprocessor 804.

The preprocessor 804 rearranges the received reference pixels and reconstructed pixels to generate a two-dimensional (2D) vector or a one-dimensional (1D) vector. The preprocessor 804 transfers the 2D vector or 1D vector to the estimator 806.

The prediction device may perform subsequent operations, as in the example of FIG. 8.

Figure 13:
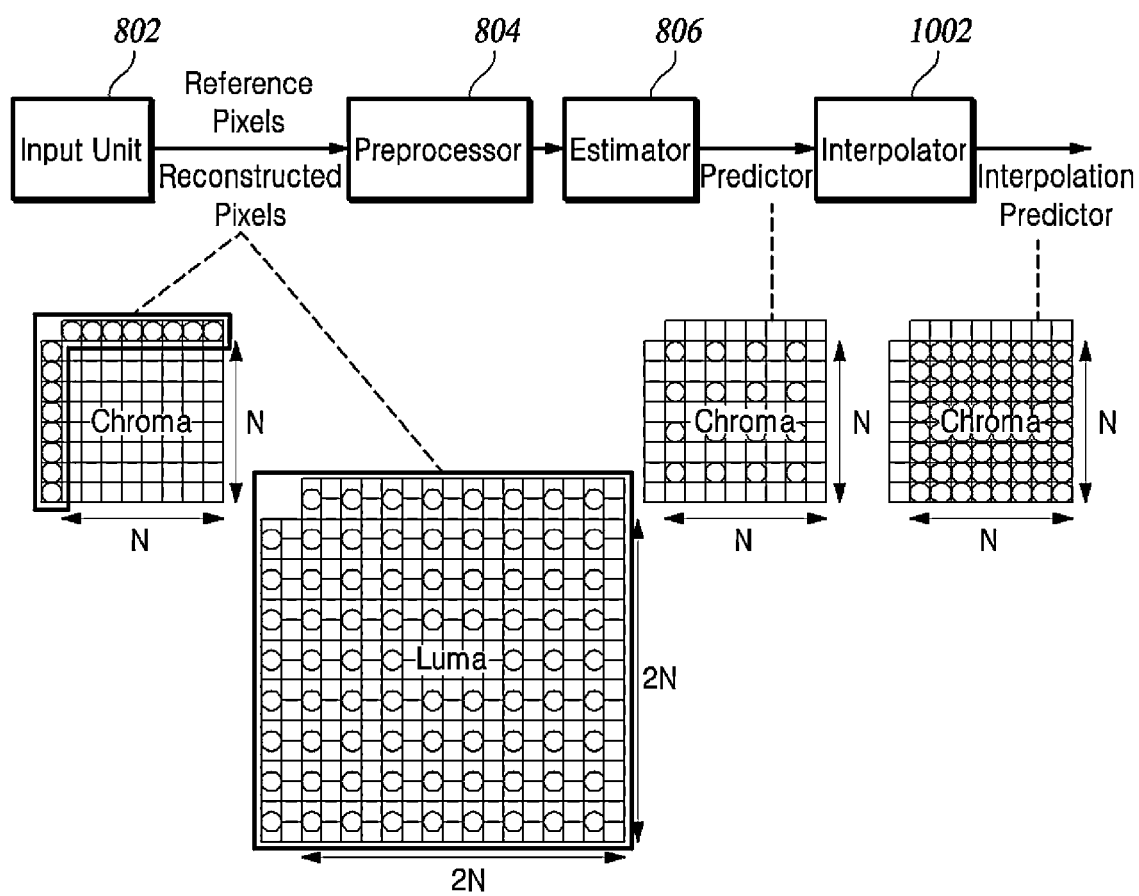
FIG. 13 is an example diagram conceptually illustrating a cross-component prediction device further utilizing reconstructed luma pixels, according to yet another embodiment of the present disclosure.

FIG. 13 is an example diagram conceptually illustrating a cross-component prediction device that further utilizes reconstructed luma pixels, according to yet another embodiment of the present disclosure.

The prediction device according to this embodiment uses a deep learning-based estimating model that performs matrix operations to generate a reduced chroma prediction block from the reference pixels and the reconstructed pixels in the luma block and then interpolates the reduced chroma prediction block to generate a final chroma prediction block. The prediction device illustrated in FIG. 13 includes the same components as the example in FIG. 10.

However, further to the reference pixels, the input unit 802 may obtain reconstructed pixels of the luma block corresponding to the target chroma block. The reference pixels here may include chroma reference pixels spatially adjacent to the target chroma block and may include luma reference pixels adjacent to the luma block corresponding to the target chroma block. Further, the reconstructed pixels in the luma block represent reconstructed pixels before being transferred to the loop filter units 180, 560. The reconstructed pixels may be subsampled as illustrated in FIG. 13. The input unit 802 transfers all obtained pixels to the preprocessor 804.

The preprocessor 804 rearranges the received reference and reconstructed pixels to generate a 2D vector or a 1D vector. The preprocessor 804 transfers the 2D vector or 1D vector to the estimator 806.

The prediction device may perform subsequent operations as in the example of FIG. 10.

Figure 14:
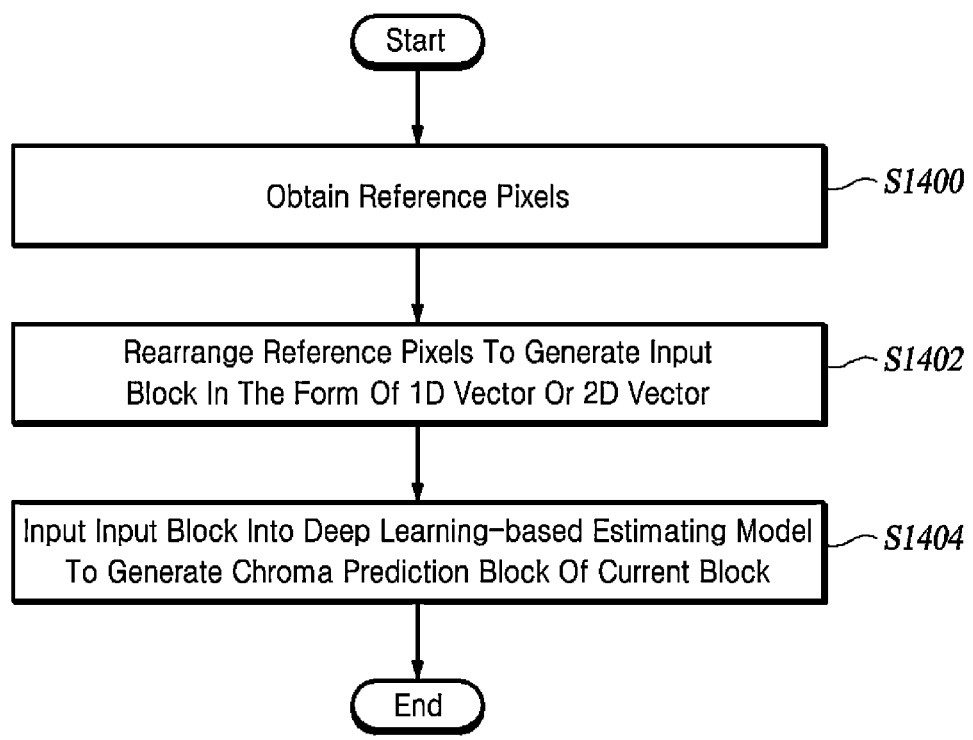
FIG. 14 is a flowchart of a cross-component prediction method, according to at least one embodiment of the present disclosure.

Referring now to FIG. 14, a method performed by the prediction device is described for performing a cross-component prediction to predict a chroma component of the current block by using a luma component.

FIG. 14 is a flowchart of a cross-component prediction method, according to at least one embodiment of the present disclosure.

The prediction device obtains reference pixels (S1400). Here, the reference pixels include chroma reference pixels spatially adjacent to a chroma block of the current block and include luma reference pixels adjacent to a luma block corresponding to the chroma block.

When obtaining the chroma reference pixels of the chroma block, the prediction device may utilize all or some of the left neighboring pixels and the top neighboring pixels, depending on the size of the current block. When obtaining the luma reference pixels of the luma block, the prediction device may utilize all or some of the left neighboring pixels and the top neighboring pixels, depending on the size of the current block. Further, the prediction device may determine the locations and values of the luma reference pixels of the luma block based on the color format of the current picture.

The prediction device may obtain the reference pixels from one or more columns adjacent to the left of the chroma block and the luma block and from one or more rows adjacent to the top of the chroma block and the luma block.

The prediction device may rearrange the reference pixels to generate an input block in the form of a 1D vector or a 2D vector (S1402).

The prediction device may separately rearrange the chroma components and luma components of the reference pixels based on the locations of the reference pixels to generate a 2D vector, i.e., a matrix. Alternatively, the prediction device may alternately rearrange the chroma components and luma components of the reference pixels to generate a 2D vector.

In another embodiment, the prediction device may separately concatenate the chroma components and luma components of the reference pixels to generate a 1D vector. Alternatively, the prediction device may alternately concatenate the chroma components and luma components of the reference pixels to generate a 1D vector.

The prediction device transfers the rearranged input block in the form of the 2D vector or 1D vector to the estimating model.

The prediction device inputs the input block into the deep learning-based estimating model to generate a chroma prediction block of the current block (S1404). The prediction device may input the rearranged input blocks in the form of the 2D vector or 1D vector into the estimating model to perform cross-component prediction. Here, the estimating model represents a deep neural network including one or more neural layers.

The estimating model may accept 2D vector, i.e., matrix, as input to generate matrix-formed chroma prediction blocks, allowing matrix-based operations to be performed inside the estimating model. Alternatively, if 1D vector is inputted, matrix-based operations may be performed inside the estimating model for the estimating model to generate matrix-formed chroma prediction blocks. In this case, the estimating model generates a chroma prediction block having the same size as the current chroma block.

Meanwhile, the estimating model may be pre-trained by the training unit to learn to generate, from the inputted reference pixels, a chroma prediction block that approximates the original chroma block. The parameters of the trained estimating model may be shared between the video encoding apparatus and the video decoding apparatus.

Hereinafter, using the illustration of FIG. 15, a method performed by the estimating model for making cross-component prediction is described for when the estimating model generates a reduced chroma prediction block.

Figure 15:
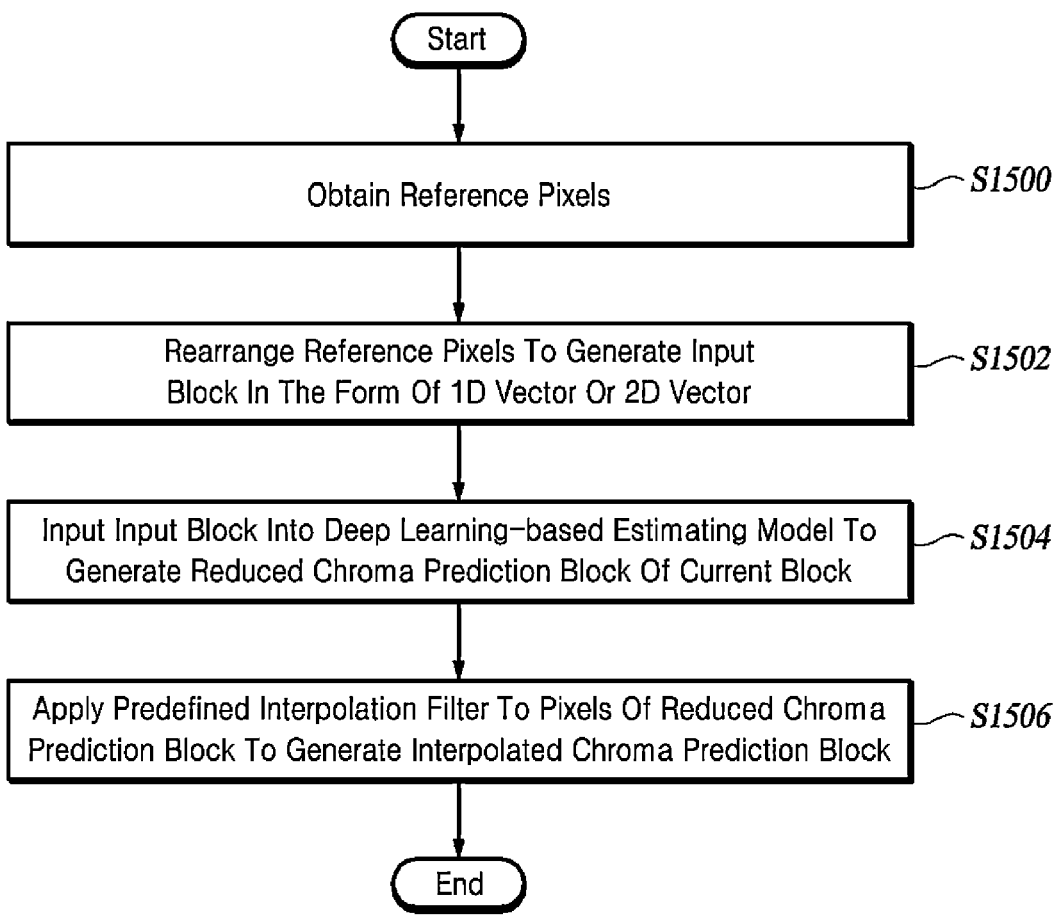
FIG. 15 is a flowchart of a cross-component prediction method, according to another embodiment of the present disclosure.

FIG. 15 is a flowchart of a cross-component prediction method, according to another embodiment of the present disclosure.

The prediction device obtains reference pixels (S1500). Here, the reference pixels include chroma reference pixels spatially adjacent to a chroma block of the current block and include luma reference pixels adjacent to a luma block corresponding to the chroma block.

The prediction device rearranges the reference pixels to generate an input block in the form of a 1D vector or a 2D vector (S1502).

The prediction device inputs the input block into a deep learning-based estimating model to generate a reduced chroma prediction block of the current block (S1504). The prediction device may input the rearranged input block in the form of the 2D vector or 1D vector into the estimating model to perform cross-component prediction. At this time, the estimating model generates a reduced chroma prediction block that is smaller than the current chroma block, in terms of reduced computation.

The pixels of the reduced chroma prediction block may be pixels present at locations that are subsampled in the row or column direction in the current chroma block.

The prediction device applies predefined interpolation filtering to the pixels of the reduced chroma prediction block to generate an interpolated chroma prediction block (S1506). The prediction device may generate the interpolated chroma prediction block by generating values between pixels according to the interpolation filtering so that the size (or number of pixels) of the interpolated chroma prediction block and the size (or number of pixels) of the current chroma block are the same. Here, interpolation filtering refers to the process of filtering the pixels of the reduced chroma prediction block by using an interpolation filter.

The following describes a method performed by the prediction device for further utilizing the reconstructed pixels of the luma block to perform cross-component prediction.

Figure 16:
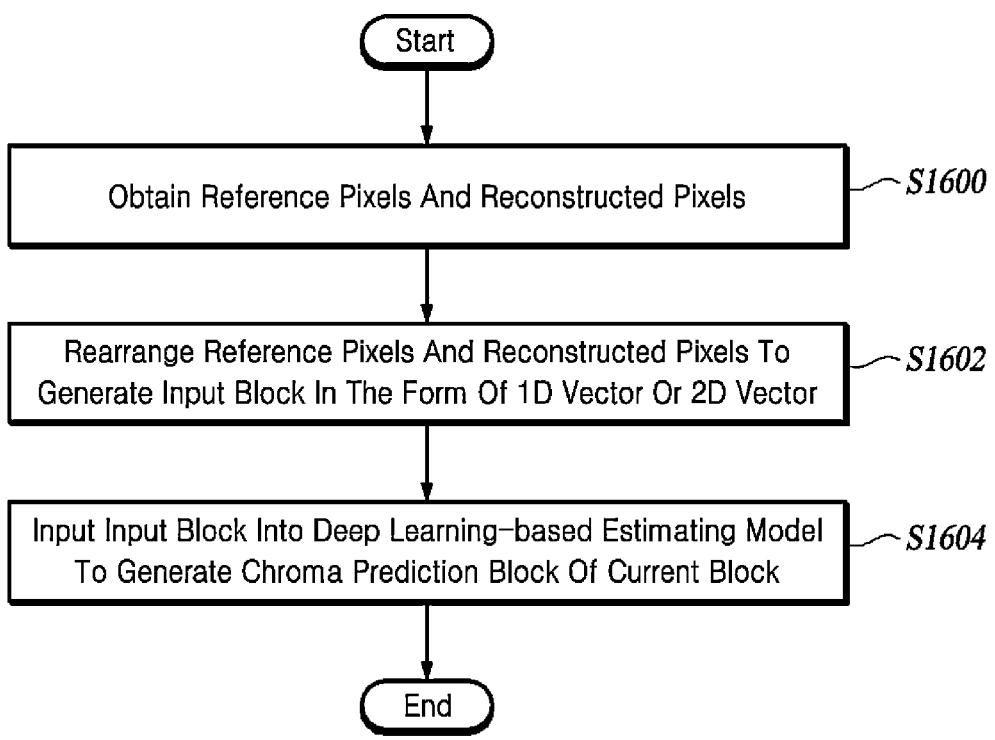
FIG. 16 is a flowchart of a cross-component prediction method further utilizing reconstructed pixels in a luma block, according to at least one embodiment of the present disclosure.

FIG. 16 is a flowchart of a cross-component prediction method that further utilizes reconstructed pixels in a luma block, according to at least one embodiment of the present disclosure.

The prediction device obtains reference pixels and reconstructed pixels (S1600). Here, the reference pixels include chroma reference pixels spatially adjacent to a chroma block in the current block and include luma reference pixels adjacent to a luma block corresponding to the chroma block. Further, the reconstructed pixels represent the reconstructed pixels of the luma block.

In obtaining the reconstructed pixels of the luma block, the prediction device may utilize all or a subsampled portion of the pixels of the luma block.

The prediction device rearranges the reference pixels and the reconstructed pixels to generate an input block in the form of a 1D vector or a 2D vector (S1602).

The prediction device inputs the input block into a deep learning-based estimating model to generate a chroma prediction block of the current block (S1604). The prediction device may input the rearranged input block in the form of the 2D vector or 1D vector into the estimating model to perform cross-component prediction. Here, the estimating model represents a deep neural network including one or more neural layers.

For the case where the estimating model generates a reduced chroma prediction block, a method is described below where the prediction device further utilizes the reconstructed pixels of the luma block to perform the cross-component prediction.

Figure 17:
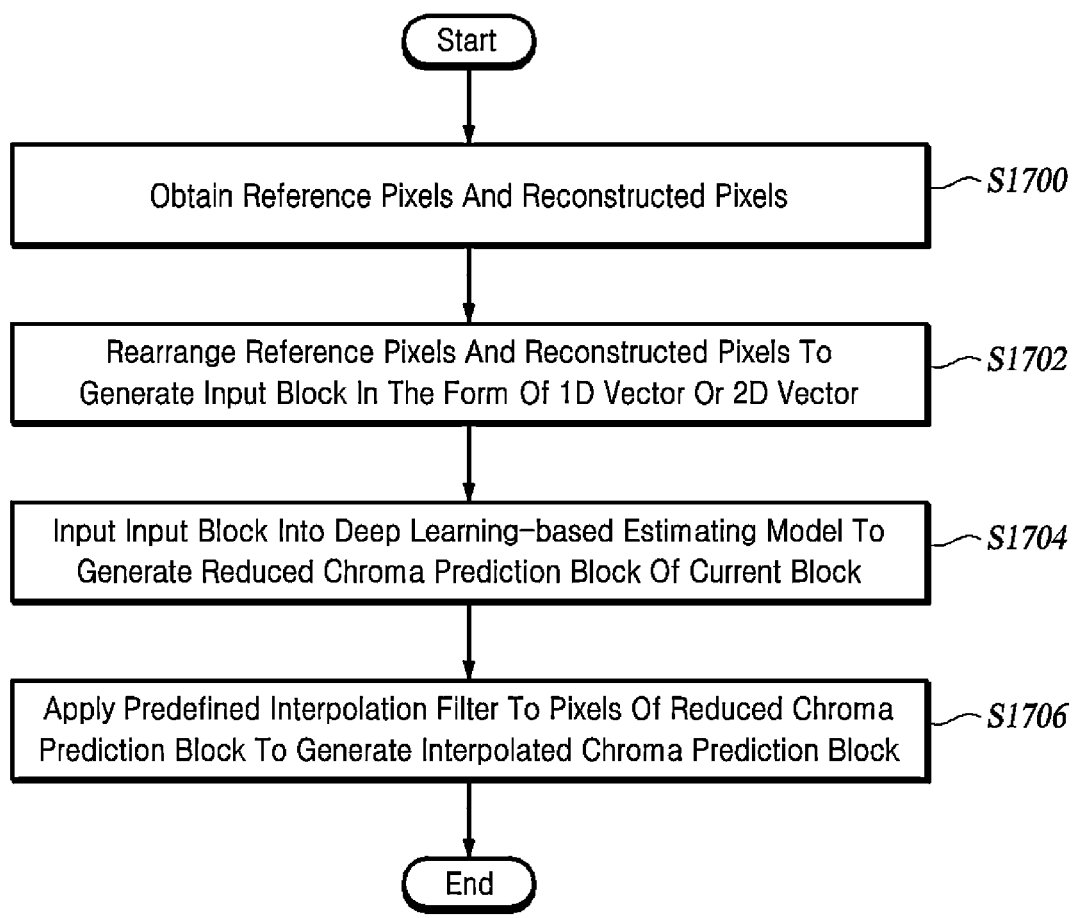
FIG. 17 is a flowchart of a cross-component prediction method that further utilizes reconstructed pixels of the luma block, according to another embodiment of the present disclosure.

FIG. 17 is a flowchart of a cross-component prediction method that further utilizes reconstructed pixels in a luma block, according to another embodiment of the present disclosure.

The prediction device obtains reference pixels and reconstructed pixels (S1700). Here, the reference pixels include chroma reference pixels spatially adjacent to a chroma block of the current block and include luma reference pixels adjacent to a luma block corresponding to the chroma block. Further, the reconstructed pixels represent the reconstructed pixels of the luma block.

The prediction device rearranges the reference pixels and the reconstructed pixels to generate an input block in the form of a 1D vector or a 2D vector (S1702).

The prediction device inputs the input block into a deep learning-based estimating model to generate a reduced chroma prediction block of the current block (S1704). The prediction device may input the rearranged input block in the form of the 2D vector or 1D vector into the estimating model to perform cross-component prediction. At this point, the estimating model generates the reduced chroma prediction block that is smaller in size than the current chroma block, in terms of reduced computation.

The prediction device applies predefined interpolation filtering to the pixels of the reduced chroma prediction block to generate an interpolated chroma prediction block (S1706). Here, interpolation filtering refers to filtering the pixels of the reduced chroma prediction block by using an interpolation filter.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure should not limited by the above explicitly described embodiments but by the claims and equivalents thereof.

REFERENCE NUMERALS

122: intra predictor
542: intra predictor
802: input unit
804: preprocessor
806: estimator
1002: interpolator

What is claimed is:

1. A method performed by a video decoding apparatus for predicting a chroma component of a current block using a luma component, the method comprising:
   obtaining reference pixels that include chroma reference pixels spatially adjacent to a chroma block of the current block and include luma reference pixels adjacent to a luma block corresponding to the chroma block;
   generating an input block to be inputted into a neural network-based estimating model by using the reference pixels, wherein the input block is formed as a one-dimensional (1D) vector or a two-dimensional (2D) vector, and wherein reconstructed pixels in the luma block are not used for generating the input block; and
   generating a chroma prediction block of the current block by inputting the input block into the neural network-based estimating model.

2. The method of claim 1, wherein obtaining the reference pixels comprises:
   obtaining all or some of left neighboring pixels and top neighboring pixels of the chroma block as the chroma reference pixels.

3. The method of claim 1, wherein obtaining the reference pixels comprises:
   obtaining all or some of left neighboring pixels and top neighboring pixels of the luma block as the luma reference pixels.

4. The method of claim 3, wherein obtaining the reference pixels comprises:
   determining locations and values of the luma reference pixels according to a color format of a current picture comprising the current block.

5. The method of claim 1, wherein obtaining the reference pixels comprises:
   obtaining the reference pixels from multiple columns adjacent to a left side of the chroma block and a left side of the luma block, and multiple rows adjacent to a top of the chroma block and a top of the luma block.

6. The method of claim 1, wherein generating the input block comprises:
rearranging chroma components and luma components of the reference pixels separately and respectively based on locations of the reference pixels.

7. The method of claim 1, wherein the estimating model is implemented as a deep neural network comprising at least one or more neural layers and is configured to perform matrix-based operations on the input block.

8. The method of claim 1, wherein generating the chroma prediction block comprises:
causing the estimating model to generate the chroma prediction block to include pixels that are equal in number to pixels of the chroma block.

9. The method of claim 1, wherein generating the chroma prediction block comprises:
causing the estimating model to generate a reduced chroma prediction block to include pixels fewer than pixels of the chroma block.

10. The method of claim 9, wherein the pixels of the reduced chroma prediction block are present at locations subsampled in a row or column direction in the chroma block.

11. The method of claim 9, further comprising:
applying a predefined interpolation filtering to the pixels of the reduced chroma prediction block to generate an interpolated chroma prediction block having pixels that are equal in number to the pixels of the chroma block.

12. The method of claim 1, wherein generating the chroma prediction block comprises:
decoding, from a bitstream, a syntax element for indicating one of a plurality of pre-trained neural network-based estimating models; and
selecting, as the estimating model, one of the plurality of pre-trained neural network-based estimating models based on the syntax element.

13. The method of claim 1, wherein the reference pixels are selected from a group of left neighboring pixels and a group of top neighboring pixels based on a size of the current block.

14. A method performed by a video encoding apparatus for predicting a chroma component of a current block using a luma component, the method comprising:
obtaining reference pixels that include chroma reference pixels spatially adjacent to a chroma block of the current block and include luma reference pixels adjacent to a luma block corresponding to the chroma block;
generating an input block to be inputted into a neural network-based estimating model by using the reference pixels, wherein the input block is formed as a one-dimensional (1D) vector or a two-dimensional (2D) vector, and wherein reconstructed pixels in the luma block are not used for generating the input block; and
generating a chroma prediction block of the current block by inputting the input block into the neural network-based estimating model.

15. A method for providing a video decoding apparatus with video data, the method comprising:
encoding the video data into a bitstream; and
transmitting the bitstream to the video decoding apparatus,
wherein encoding the video data comprises:
obtaining reference pixels that include chroma reference pixels spatially adjacent to a chroma block of a current block and include luma reference pixels adjacent to a luma block corresponding to the chroma block,
generating an input block to be inputted into a neural network-based estimating model by using the reference pixels, wherein the input block is formed as a one-dimensional (1D) vector or a two-dimensional (2D) vector, and wherein reconstructed pixels in the luma block are not used for generating the input block, and
generating a chroma prediction block of the current block by inputting the input block into the neural network-based estimating model.

* * * * *